United States Patent [19]

Cap et al.

[11] Patent Number: 5,243,242
[45] Date of Patent: Sep. 7, 1993

[54] IN-HUB MOTOR

[75] Inventors: Heinrich Cap, Peterzell; George F. Papst, St. Georgen, both of Fed. Rep. of Germany

[73] Assignee: Papst-Motoren GmbH & Co. KG, Black Forest, Fed. Rep. of Germany

[21] Appl. No.: 629,060

[22] Filed: Dec. 14, 1990

Related U.S. Application Data

[63] Continuation of Ser. No. 200,654, May 31, 1988, abandoned.

[30] Foreign Application Priority Data

May 29, 1987 [DE] Fed. Rep. of Germany ....... 3718073

[51] Int. Cl.$^5$ ............................................. H02K 7/00
[52] U.S. Cl. ..................... 310/67 R; 310/42; 310/90; 310/156
[58] Field of Search .............. 310/67 R, 156, 157, 310/90, 42; 177/80, 135; 360/97.1

[56] References Cited

U.S. PATENT DOCUMENTS

| | | | |
|---|---|---|---|
| 4,301,487 | 11/1981 | Maruyama | 277/80 |
| 4,554,473 | 11/1985 | Muller | 310/67 R |
| 4,658,312 | 4/1987 | Elsasser | 310/156 |
| 4,779,165 | 10/1988 | Elsasser | 310/156 |
| 4,814,652 | 3/1989 | Wright | 310/67 R |
| 4,818,907 | 4/1989 | Shirotori | 310/67 R |
| 4,824,122 | 4/1989 | Raj | 277/80 |
| 5,006,943 | 4/1991 | Elsasser | 310/156 |

OTHER PUBLICATIONS

Van Nostrand's Scientific Encyclopedia, fourth ed.; Princeton, N.J.; 1938, 1947, 1958, 1968; 3 pages.

*Primary Examiner*—R. Skudy
*Attorney, Agent, or Firm*—Fitch, Even, Tabin & Flannery

[57] ABSTRACT

In order to reduce the cost of producing an in-hub motor, which consists of a hub and the motor which is located in this hub and which contains magnets, magnetic yokes, coils, and shieldings, the hub (2) made of magnetizable steel is coated at least on the outer surface (20) with a noncorrosive coating which is reduced by means of final machining in the completed state of the motor.

9 Claims, 2 Drawing Sheets

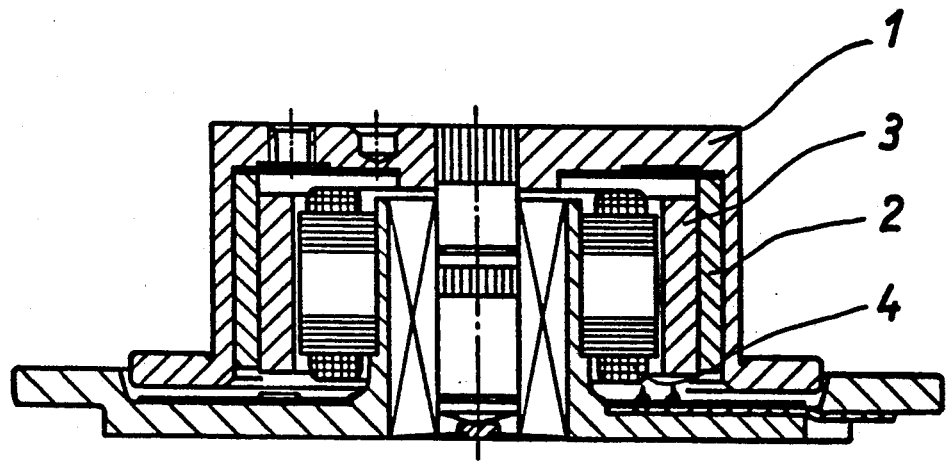
PRIOR ART  Fig.1
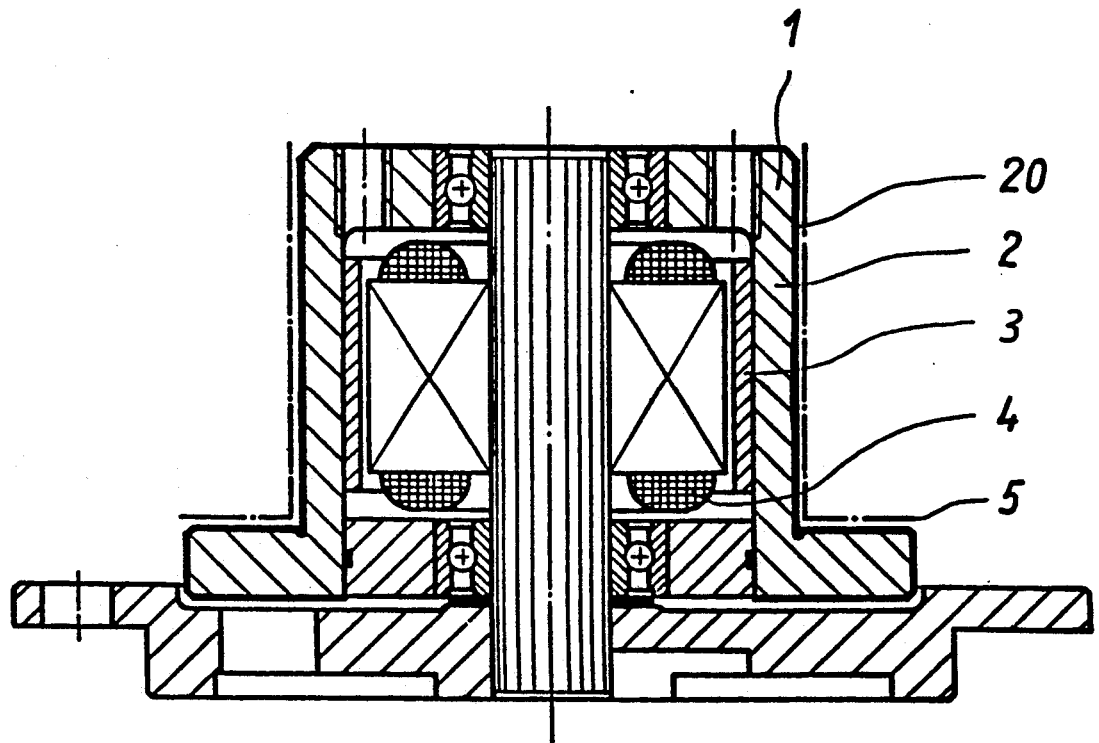
Fig. 2

IN-HUB MOTOR

This application is a continuation of application Ser. No. 200,654 filed May 31, 1988.

BACKGROUND OF THE INVENTION

The invention concerns an in-hub motor.

In-hub motors, as found, for example, in Winchester mechanisms in data processing, have been developed to provide a particularly high degree of freedom with respect to radial and axial eccentricity. Among other things, this freedom is obtained by giving the aluminum vat, which forms the hub and in which the magnetic yokes and magnets are secured, its fine machining, i.e., grinding or stripping, on the finished motor.

In the case of motors with a large ratio of torque to volume, the magnetic yoke and the plate hub are constructed as one piece and consist of magnetizable steel, which must have a rustproof coating. This rustproof coating prevents any machining of the hub in the finished motor, thus requiring that the hub be manufactured with very high precision before installation.

It must be borne in mind that the eccentricity tolerance of the finished motor should be the result of the sum of the eccentricity tolerances of the constituent parts so that, for example, the ball bearings, the plate hub itself, and the joining accuracy required at the time of assembly must remain below 5 $\mu$.

The rustproof coating must lie within these tolerance limits. On the other hand, it is not possible to avoid such a rustproof coating by the use of stainless steel because this steel would not exhibit those magnetic properties that are particularly necessary in this type of motor.

Thus, the expenditure of time and money in the production of this type of motor is very high due to grinding, honing, or polishing. This production expenditure cannot be reduced even if large quantities of the motor are produced.

The objective, therefore, should be to reduce this production expenditure as much as possible.

SUMMARY OF THE INVENTION

The solution to this problem is to coat the hub, which consists of magnetizable steel and which has the form of a yoke body, with a noncorrosive coating at least on the outer surface, which is reduced by final processing in the completed state.

In order to bond the noncorrosive coating to the hub, all currently known joining techniques, such as shrink coating, dipping, sputtering, or bonding of caps or casings on the hub, may be employed.

Particularly during the use of galvanically deposited aluminum, a considerable reduction in production expenditure results based on the high adhesive strength and excellent machinability.

Other materials, which adhere excellently to the iron core of the hub, are also appropriate. This suitability is even greater when the specific weights of the hub and the coating are identical.

An additional improvement can be obtained if the entire hub, both inside and outside, is covered with the noncorrosive coating. This results primarily in a long-term constancy of the minimum radial and axial eccentricity obtained after final forming. In addition, the temperature profile of shaft, ball bearing, and rotor is mutually adjusted so that eccentricity variations are minimized during operation.

The following are advantages of the process described above: the production expenditure is significantly reduced, instances of corrosion no longer occur, long- and short-term variations in eccentricity are minimized, and the mechanical stability of the rotor is improved.

BRIEF DESCRIPTION OF THE DRAWINGS

The drawing which further illustrates the invention, shows

FIG. 1 illustrates a motor of standard design;

FIG. 2 illustrates an initial application example of a motor according to the invention.

DESCRIPTION OF THE PREFERRED EMBODIMENT(S)

Figure 3:
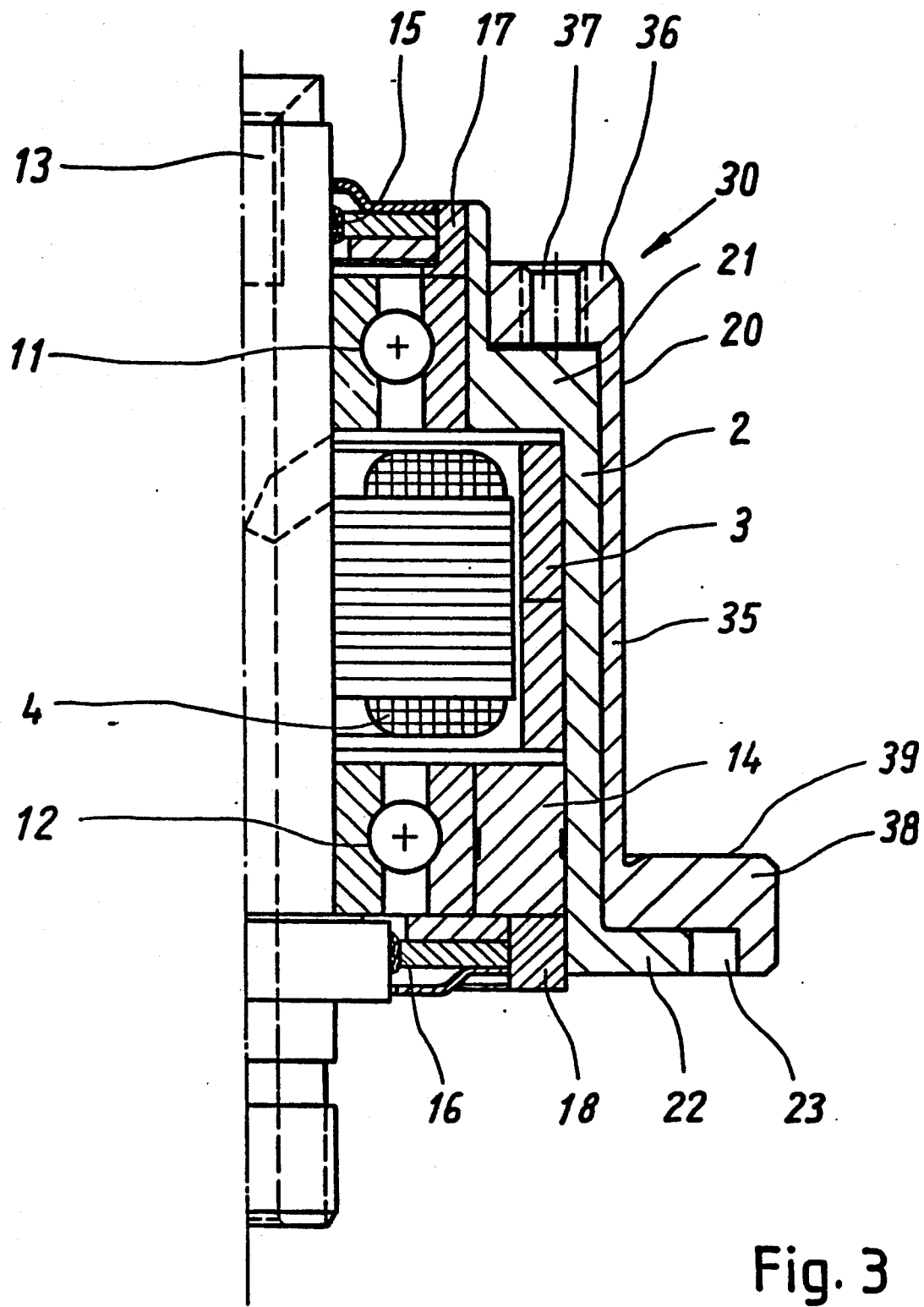
FIG. 3 illustrates a second application example of a motor according to the invention.

In FIG. 1, hub 1, consisting of aluminum supports a magnetic yoke in the form of yoke body 2 on which magnets 3 are arranged: stator coils 4 drive hub 1. The final machining of takes place in the completed state of the motor and includes the usual methods for material removal, such as finish turning by machining of the outer surface of hub 1.

In order to reduce the volume, in the motor, as shown in FIG. 2, the yoke body 2 is designed as a ringlike support and supports magnets 3. Stator coils 4 also drive the hub here. Yoke body 2 consists of magnetizable steel.

The conventionally employed noncorrosive coating 5, which is at least applied to the outer surface 20 of hub 1, however, is no longer only a few $\mu$ thick, but instead has a range in thickness of from 15 $\mu$ to approximately 200 $\mu$. Thus, it is no longer just a protection against corrosion but a mechanically machinable component which can be primarily used to reduce radial eccentricity, particularly by means of final finishing of the built-in shaft.

The coating can consist of plastic or metal and should adhere very tightly to hub 1.

FIG. 3 shows a cross section of a second application example, which, as already described in FIG. 2, contains magnetic yoke body 2 which, designed as hub 30, is made of magnetizable material. Yoke body 2 supports magnets 3. Coils 4 drive hub 30 as described in the preceding application examples. This hub 30 contains yoke body 2 which is made of magnetizable steel and which is designed as a ring-shaped support. This steel forms the magnetic yoke. Casing 35 made of aluminum is fastened to the core by means of shrink coating. The upper end (as viewed in FIG. 3) of casing 35 contains thickened rim 36, with mounting boreholes 37, with this rim turning radially toward, the inside. The lower end of casing 35 is equipped with flange 38, which, projects radially toward the outside and has planar surface 39. For the purpose of final machining, the assembled and mounted motor is put into operation, and surfaces 20 and 39 are given their final shape, for example, by means of precision turning. Bearings 11 and 12 are, on the one hand, fastened to shaft 13, and, on the other hand, to the inside of yoke body 2. Upper bearing 11 is directly installed into the yoke body 2. Lower bearing 12 is surrounded by spacer ring 14 in order to arrive at similar positions in the case of predetermined dimensions. Ferrofluid seals 15 and 16 are provided axially outwardly of each of bearings 11 and 12 and seal the motor compartment from the surrounding environment. Ferrofluid seals 15 and 16 are surrounded by eccentric rings 17 and 18 on their outside diameters. The insertion of axial mounting boreholes 37 in (thickened rim 36 of) the casing leads to a further simplification of yoke body 2, as the yoke body is simplified to a pure swivel part, since the upper and lower edges of the noncorrosive coating, which is made of easily machinable material and which is designed as casing, ensure, it is true, slightly higher material costs, but lead to a further reduction in cost due to the improved machinability.

Conventional joining techniques, such as shrink coating of a cap or casing, bonding of such elements, or coating by dipping, sputtering, or galvanization, can be used to create the coating. On the one hand, the coating should be applied so as to be sufficiently thick to ensure satisfactory handling during assembly of the motor and, on the other hand, thin enough so that it can be reduced at minimum cost during the final machining procedure on the shaft.

A relatively modern shrink-coating process uses the dynamic effect of electromagnetic parts at high pulse-like currents. This so-called magnetic molding process is particularly suited for aluminum casing 35, which is to be tightly applied to the underlying steel core of the hub, thus forming a disk storage hub.

Thin coatings of aluminum up to a thickness of 0.2 mm can be applied most effectively by means of evaporation, thus giving a uniform thickness to the entire surface.

The invention can be used advantageously particularly in hard-disk storage devices with a disk diameter of 5.25 inches or less.

Magnetic yoke body 2 as well as casing 35, preferably made of aluminum, each have a Z-shaped cross section with parts of the casing and yoke body 2 respectively, lying and adjacent and parallel to each other. The radial outer ends of lower flanges 22 and 38 are designed in such a way as to form surrounding groove 23 into which metal ballast can be axially inserted (or removed).

What is claimed is:

1. In-hub motor comprising:
 a fixed shaft extending axially of the motor;
 a stator mounted on the fixed shaft;
 a pair of ball bearings mounted on the fixed shaft axially spaced apart from each other on either axial end of the stator;
 a rotor mounted over and at least foundationally supported by said both axially spaced apart ball bearings to rotate around the stator and be separated therefrom by a cylindrical air gap, the rotor including
 a yoke body of magnetic material having a cylindrical inner surface and a cylindrical outer surface and formed to axially span both said spaced apart ball bearings in support of the rotor and
 ring shaped permanent magnets mounted on the inner surface of the yoke body opposite the stator and defining an extent of the air gap; and
 a coating of machinable noncorrosive material applied to the outer surface of the yoke body, said coating being of a predetermined thickness to provide a surface capable of being machined to reduce radial eccentricity in a finished motor.

2. Motor according to claim 1, wherein said predetermined thickness of the coating of machinable noncorrosible material is within a range of from 15 $\mu$ to approximately 200 $\mu$.

3. In-hub motor comprising:
 a fixed shaft extending axially of the motor;
 a stator mounted on the fixed shaft;
 a pair of ball bearings mounted on the fixed shaft axially spaced apart from each other on either axial end of the stator;
 a rotor mounted over and at least foundationally supported by both said axially spaced apart ball bearings to rotate around the stator and be separated therefrom by a cylindrical air gap, the rotor including
 a yoke body of magnetic material having a cylindrical inner surface and a cylindrical outer surface and formed to axially span both said spaced apart ball bearings in support of the rotor and
 ring shaped permanent magnets mounted on the inner surface of the yoke body opposite the stator and defining an extent of the air gap; and
 a casing of noncorrosive material of predetermined thickness having two axially opposing ends, one of which is for securing the casing to the yoke body of the rotor, the casing being made to conform to the outer surface of the yoke body and being nested over the outer surface of the yoke body providing a machinable surface for reducing radial eccentricity in a finished motor.

4. Motor according to claim 3, wherein the casing of noncorrosive material further has at its mounting end a thickened rim with a mounting borehole therethrough, the rim turning radially toward the inside of the motor.

5. Motor according to claim 3, wherein the casing of noncorrosive material further has at its end opposite its mounting end a flange with a planar surface which turns radially outwardly of the motor and terminates in a radially outer end.

6. Motor according to claim 5, wherein the yoke body also includes a radially outwardly extending flange terminating in a radially outer end, the yoke body flange extending in parallel to the casing flange at the casing end opposite its mounting end and further including a surrounding groove with an axial recess provided between the radial outer ends of the two flanges.

7. Motor according to claim 4 wherein the yoke body includes a radially inwardly extending flange in parallel to the thickened rim, the flange mounting directly on an adjacent bearing and supporting the thickened rim.

8. Motor according to claim 3, wherein said predetermined thickness of said casing is within a range of from 15 $\mu$ to 2 mm.

9. Motor according to claim 3, wherein the noncorrosive material is aluminum.

* * * * *

UNITED STATES PATENT AND TRADEMARK OFFICE
CERTIFICATE OF CORRECTION

PATENT NO. : 5,243,242
DATED : September 7, 1993
INVENTOR(S) : Cap et al.

It is certified that error appears in the above-identified patent and that said Letters Patent is hereby corrected as shown below:

Column 2, line 22, after "machining of" insert --the hub--.

Column 2, line 44, after "body 2" insert --with an upper flange 21 and--.

Column 3, line 37, after "casing" insert --35--.
    Column 3, line 37, after "yoke body 2" insert a comma.
    Column 3, line 38, after "lying" delete "and".

Claim 1, Column 3, line 51, change "said both" to --both said--.

Claim 2, Column 4, lines 7-8, change "noncorrosible" to --noncorrosive--.

Signed and Sealed this

Twenty-first Day of June, 1994

Attest:

BRUCE LEHMAN

*Attesting Officer*     *Commissioner of Patents and Trademarks*